United States Patent [19]

Strange

[11] 3,886,989
[45] June 3, 1975

[54] SELF-THREADING NUT
[75] Inventor: John Strange, Llanishen, Wales
[73] Assignee: Firth Cleveland Fastenings Ltd., England
[22] Filed: Feb. 11, 1974
[21] Appl. No.: 441,526

[30] Foreign Application Priority Data
July 17, 1973 United Kingdom............... 34021/73

[52] U.S. Cl............................................ 151/7; 85/36
[51] Int. Cl...................... F16b 39/284; F16b 37/00
[58] Field of Search............. 85/32 R, 32 V, 36, 35; 151/7

[56] References Cited
UNITED STATES PATENTS

| | | | |
|---|---|---|---|
| 3,001,567 | 9/1961 | Brill | 151/7 |
| 3,326,260 | 6/1967 | Tucker | 151/7 |
| 3,364,807 | 1/1968 | Holton | 85/36 |
| 3,387,642 | 6/1968 | Bennett | 85/36 |
| 3,388,732 | 6/1968 | Holton | 85/36 |

FOREIGN PATENTS OR APPLICATIONS
228,505  2/1925  United Kingdom.................... 151/7

Primary Examiner—Marion Parsons, Jr.
Attorney, Agent, or Firm—Teagno & Toddy

[57] ABSTRACT

A self-threading, nut type fastener for self-threading engagement with an exteriorly threaded member. The fastener includes a body having an axially extending bore therethrough, said bore being of a smaller diameter at one end thereof and of a larger diameter at the other end thereof with a juncture therebetween. The larger diameter portion of the bore includes a plurality of circumferentially spaced, radially inwardly and axially extending thread engaging ribs having their innermost ends terminating at the juncture. The outermost ends of the ribs and the juncture are arranged on a helix with respect to the axis of the bore.

7 Claims, 2 Drawing Figures

SELF-THREADING NUT

BACKGROUND OF THE INVENTION

1. Field of the Invention

This invention relates to self-threading fasteners and more particularly to self-threading fasteners having a bore for self-threadingly receiving an externally threaded member.

2. Description of the Prior Art

Heretofore, non-threaded nuts of nylon, or other synthetic resinous material, have been utilized wherein a screw thread is formed by the forceful introduction of an externally threaded member, such as a bolt. However, it has been found in practice that the reaction forces acting against the nut during the thread cutting action often impart stresses in the material of the nut member which lead to damage thereof thereby rendering it unsuitable for use.

A self-threading nut of the type described in U.S. Pat. No. 3,387,642 issued June 11, 1968 utilized spaced ribs within a bore of the nut, which were progressively engaged by the leading end of the thread on the bolt thus initially cutting a thread on a line, the length of which was considerably less than the circumference of the bore. Such progressive engagement continued for a distance axially of the nut sufficiently to impart a relatively easy starting action. Sufficient contact with the ribs in an axial direction was provided to attain firm engagement with the nut by the time that the leading end of the bolt arrives at the entrance of the main bore of the nut. Such progressive engagement was accomplished by enlarging the bore adjacent the entrance end of the nut and by providing spaced ribs which extended radially inwardly from the enlarged bore. Such ribs, at one end, terminate adjacent the main bore and at the other end in the region of the entrance zone for the leading end of the bolt. While such self-threading fasteners were a great improvement over the existing prior art, it has been found in practice that even if the outermost ends of the ribs were arranged on a helical path corresponding to the helix angle of the threaded member to be engaged in the fastener, there was a substantial risk that the externally threaded fastener would become canted with respect to the axis of the threaded member receiving bore of the nut. Such canting is undesirable as it may lead to misalignments, crossthreading and the like.

SUMMARY OF THE INVENTION

In accordance with the present invention, the drawbacks of the prior art have been overcome to the extent that a self-threading nut of nylon, or other moldable material, is provided which will resist canting as well as overcoming damaging stresses while being applicable in the manner of a conventional nut. The above is accomplished by utilizing a fastener having an externally threaded member receiving bore therethrough. The bore has a plain section of smaller diameter adjacent its trailing end, a ribbed section of larger diameter adjacent its leading end and a juncture therebetween. The innermost ends of the ribs terminate at the juncture while the outermost ends of the ribs are arranged on a helix with respect to the longitudinal axis of the bore. The juncture is also arranged on a helix with respect to the longitudinal axis of the bore, said juncture and rib end helix being in the hand of and preferably corresponding to the thread lead angle of the externally threaded member to be received.

Accordingly, an object of the present invention is to provide a new and improved self-threading fastener.

Another object of the present invention is to provide a new and improved self-threading fastener of the type having an externally threaded member receiving bore which will resist undue stresses on the fastener and will also resist canting of the received externally threaded member.

These and other objects and advantages of the present invention will become apparent from a reading of the detailed description of the preferred embodiment taken in view of the attached drawings.

DESCRIPTION OF THE PREFERRED EMBODIMENT

Figure 1:
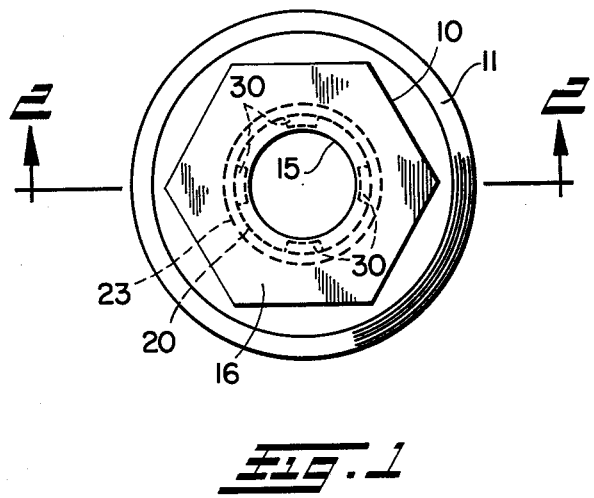
FIG. 1 is a plane view of the self-threading fastener of the present invention.

The self-threading nut of the present invention comprises a one-piece structure of nylon, or other synthetic resinous material, the body of which is indicated at 10 as having a conventional hexagonal or other non-circular external form. The nut may also have a washer 11 formed integrally therewith at the end face 12 of the nut. The nut has a main bore 15 of uniform diameter extending axially from the end face 16 to an intermediate point 17, which preferably is located at a distance from the face 16 of more than half the distance between the face 16 and the face 12 of the nut.

The nut is also provided with an enlarged bore 20 which starts at the end 17 of the main bore and which terminates short of the face 12. As shown the termination point is indicated at 22. The body is chamfered at 23 between the point 22 and the face 12 so as to guide the leading end of a threaded member which is intended to be used with the nut. Additionally, the body is chamfered at 24 between the main bore and the enlarged bore.

To facilitate the entrance of the threaded member into the nut, the body is shown as having a plurality of spaced ribs 30 which extend radially inwardly from the enlarged bore 20 and each of which terminates at a surface 31 which is slightly larger in diameter than the diameter of the bore 15. Preferably, each rib is tapered in an axial direction with the thickest portion being adjacent the line 17 of the main bore and its thinner portion being at the end remote from the line 17. The thickness of each rib as measured in a peripheral direction may be varied, and the number of ribs may also be varied as desired. Four ribs are shown but, in practice, it is contemplated that all of the ribs, taken together at their widest extent, should not exceed a total of 50 percent of the circumference of the bore 15.

Figure 2:
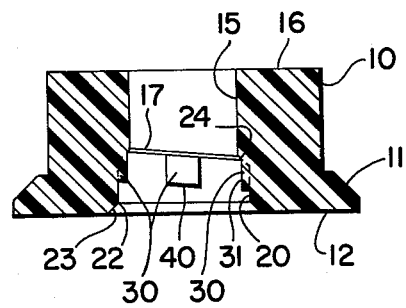
FIG. 2 is a longitudinal sectional view of the self-threading fastener of the present invention.

As shown in FIG. 2 the ends 40 of the ribs 30 terminate on a helix, so as to reduce the resistance to the initial cutting action by engaging the ribs progressively as the bolt is rotated. Preferably, the helix corresponds to the pitch of the thread on the bolt with which the nut is intended to be used. The chamfered portion 24 which defines a stepped juncture between the plain, or main bore portion 15 and the enlarged, ribbed bore portion 20 also defines a helical step, preferably of the same hand and equal to the helix of the rib ends 40.

It has been found that the provision of a helical juncture between the main bore portion and the ribbed bore portion overcomes the problem of the canting of an externally threaded member relative to the longitudinal axis of the threaded member receiving bore.

In use, whenever an externally threaded member such as a threaded bolt is introduced into the chamfered end of the bore 20 the ribs are encountered progressively by the lead thread of the bolt, and the material of the nut is therefore displaced initially in small amounts and hence, substantially without risk that the material of the nut will be overstressed. Part-threads are thus formed progressively in the faces of the ribs and subsequently the complete thread is formed in the main bore 15.

It is to be understood that the present invention is applicable to members other than nuts and that it can be applied to any article of any plastic or metal which is capable of being self-threaded upon the application of a threaded member thereto.

Although this invention has been described in its preferred form with a certain degree of particularity, it is understood that the present disclosure of the preferred form has been made only by way of example and that numerous changes in the details of construction and combination and arrangement of parts may be resorted to without departing from the spirit and the scope of the invention as hereinafter claimed.

I claim:

1. A self-threading fastener adapted for self-threading engagement with an externally threaded member, said fastener comprising a body having a threaded member receiving bore therethrough, said bore having a plain, smaller diameter portion adjacent one end, an enlarged diameter portion adjacent the other end and a stepped juncture interposed said smaller and enlarged diameter portions, said stepped juncture being defined by a chamfered surface extending radially outwardly in a direction toward said enlarged diameter bore portion, said enlarged diameter bore portion having a plurality of circumferentially spaced, radially inwardly and axially extending thread engaging ribs made of a deformable material which terminate at their innermost ends at the stepped juncture, said ribs having inner radial faces which together define a diameter which is larger than the diameter of said smaller diameter bore portion whereby said ribs are adapted to be progressively engaged by a leading edge of an externally threaded member so that relatively small amounts of material are displaced initially from the ribs prior to self-threading engagement of the externally threaded member through the smaller diameter bore portion, the ends of the ribs remote from the smaller diameter bore portion and the stepped juncture both defining a helix of equal angle in respect to the longitudinal axis of the bore.

2. The fastener of claim 1 wherein said helix angle corresponds to the pitch angle of the externally threaded member.

3. A fastener according to claim 2 including a washer-like member integral therewith on the end adjacent the larger bore, said washer having a chamfered surface extending from an outer face to the larger bore.

4. A fastener according to claim 1 wherein the axially extending surfaces of the respective ribs are curved so as to be substantially concentric to the smaller bore.

5. A fastening device in accordance with claim 1, wherein said body portion is made of a polymeric material.

6. A fastening device in accordance with claim 1 wherein all of said ribs taken together at their widest peripheral extent comprise less than 50 percent of the circumference of said smaller diameter bore portion.

7. A fastener according to claim 1, wherein the exterior of said fastener is provided with a polygonal configuration.

* * * * *